(12) United States Patent
Chen

(10) Patent No.: US 11,540,045 B2
(45) Date of Patent: Dec. 27, 2022

(54) AUDIO TRANSDUCER SYSTEM AND AUDIO TRANSDUCER DEVICE OF THE SAME

(71) Applicant: Hsiao-Han Chen, Tainan (TW)

(72) Inventor: Hsiao-Han Chen, Tainan (TW)

(*) Notice: Subject to any disclaimer, the term of this patent is extended or adjusted under 35 U.S.C. 154(b) by 14 days.

(21) Appl. No.: 17/361,976

(22) Filed: Jun. 29, 2021

(65) Prior Publication Data
US 2021/0409862 A1    Dec. 30, 2021

(30) Foreign Application Priority Data
Jun. 30, 2020   (TW) ................. 109122102

(51) Int. Cl.
*H04R 1/34*     (2006.01)
*H04R 3/00*     (2006.01)
*H04R 1/08*     (2006.01)
*H04R 29/00*    (2006.01)
*G06V 40/16*    (2022.01)

(52) U.S. Cl.
CPC .......... *H04R 1/342* (2013.01); *G06V 40/165* (2022.01); *G06V 40/166* (2022.01); *H04R 1/08* (2013.01); *H04R 3/005* (2013.01); *H04R 29/005* (2013.01); *H04R 2499/11* (2013.01)

(58) Field of Classification Search
CPC ...... H04R 1/342; H04R 3/005; H04R 29/005; H04R 2201/40; H04S 2400/15; G06V 40/161
See application file for complete search history.

(56) References Cited

U.S. PATENT DOCUMENTS

| | | | |
|---|---|---|---|
| 2012/0050527 A1* | 3/2012 | Lee ................. | F16M 11/18 348/135 |
| 2012/0224716 A1* | 9/2012 | Ohtsuka ............. | H04R 5/027 381/92 |

* cited by examiner

*Primary Examiner* — Kile O Blair
(74) *Attorney, Agent, or Firm* — Muncy, Geissler, Olds & Lowe, P.C.

(57) ABSTRACT

An audio transducer device includes an audio transducer, a controller and a direction adjusting mechanism. The audio transducer has a sound receiving surface formed with multiple sound collecting holes, and multiple microphones corresponding in position to the sound collecting holes. The controller is detachably mounted to an electronic device, and controls the microphones to cooperatively perform directional sound reception to obtain audio data. The direction adjusting mechanism interconnects an audio transducer shell and the controller such that the sound receiving surface can be rotated to a position where a normal direction thereof and an image capturing direction of the electronic device forming a desired angle therebetween.

23 Claims, 14 Drawing Sheets

US 11,540,045 B2

AUDIO TRANSDUCER SYSTEM AND AUDIO TRANSDUCER DEVICE OF THE SAME

CROSS-REFERENCE TO RELATED APPLICATION

This application claims priority of Taiwanese Invention Patent Application No. 109122102, filed on Jun. 30, 2020.

FIELD

The disclosure relates to a sound acquisition device and system, and more particularly to an audio transducer device and system that is adapted for use with an electronic device.

BACKGROUND

With the rapid advancement of relevant technology, webcasting has evolved into a very popular industry.

In order to facilitate live broadcast operations at any location, it is common for a live broadcaster to use a mobile device such as a mobile phone as an image capture device and live broadcast operating platform, and perform directional sound reception through a microphone device that is additionally installed on the mobile device.

The external microphone device can be roughly divided into two types according to their sound reception function. A first type is designed to pick up sound coming from a fixed direction (e.g., a front direction). The second type is designed to pick up sound from whichever direction that has the largest voice energy in front of it, so the sound receiving direction will change with changes in voice energy distribution. When the first type of microphone device is used, the live broadcaster must always stand within a fixed area so as to direct their voice in the fixed direction with respect to the microphone device. If the live broadcaster moves away from the fixed area, the sound reception will drop significantly. When the second type of microphone device is used, because it attempts to pick up sound from the direction with the largest voice energy in front of it, if the live broadcaster is in a noisy environment or at a place with multiple audio sources, such as in a department store, at a marketplace, on a street or at a tourist attraction, etc., the microphone device may often change its sound reception direction and be directed to an audio source other than the live broadcaster. In such a scenario, the microphone device cannot be controlled to receive sound coming from the direction of only the live broadcaster.

SUMMARY

Therefore, an object of the disclosure is to provide an audio transducer device that can alleviate at least one of the drawbacks of the prior art.

According to the disclosure, the audio transducer device includes an audio transducer, a controller and a direction adjusting mechanism. The audio transducer includes a transducer shell having a sound receiving surface formed with multiple sound collecting holes, and a microphone module disposed in the transducer shell and including multiple microphones. The microphones correspond in position to the sound collecting holes of the sound receiving surface for receiving sound. The controller is to be detachably mounted and communicatively connected to an electronic device capable of capturing images and that is communicatively connected to the audio transducer. The controller is configured to control the microphones to cooperatively perform directional sound reception to obtain audio data that is to be transmitted to the electronic device. The direction adjusting mechanism interconnects the transducer shell and the controller in such a way that the transducer shell is rotatable relative to the controller for rotating the sound receiving surface to a position where a normal direction of the sound receiving surface and an image capturing direction of the electronic device form an angle as desired by a user therebetween.

Another object of the disclosure is to provide an audio transducer system that can alleviate at least one of the drawbacks of the prior art.

According to the disclosure, the audio transducer system includes an audio transducer device adapted for being mounted and communicatively connected to an electronic device, and a sound pickup control module that is a software to be installed in the electronic device. The audio transducer device has a sound receiving surface to be rotated to a position where a normal direction of the sound receiving surface and an image capturing direction of the electronic device form an angle as desired by a user therebetween, and includes a microphone module. The sound receiving surface is formed with multiple sound collecting holes. The microphone module includes multiple microphones that correspond in position to the sound collecting holes of the sound receiving surface for receiving sound, and is configured to be controlled by a beamforming technology to perform directional sound reception to pick up sound coming from a sound reception direction that corresponds to a direction data piece received by the audio transducer device. The sound pickup control module includes an image tracking unit and a sound pickup control unit. The image tracking unit is configured to track a position of a target person in a captured image based on a target feature parameter set that corresponds to the target person to obtain the direction data piece, where the captured image is an image captured by the electronic device. The sound pickup control unit is configured to control the electronic device to transmit the direction data piece to the audio transducer device.

BRIEF DESCRIPTION OF THE DRAWINGS

Other features and advantages of the disclosure will become apparent in the following detailed description of the embodiment(s) with reference to the accompanying drawings, of which.

DETAILED DESCRIPTION

Figure 1:
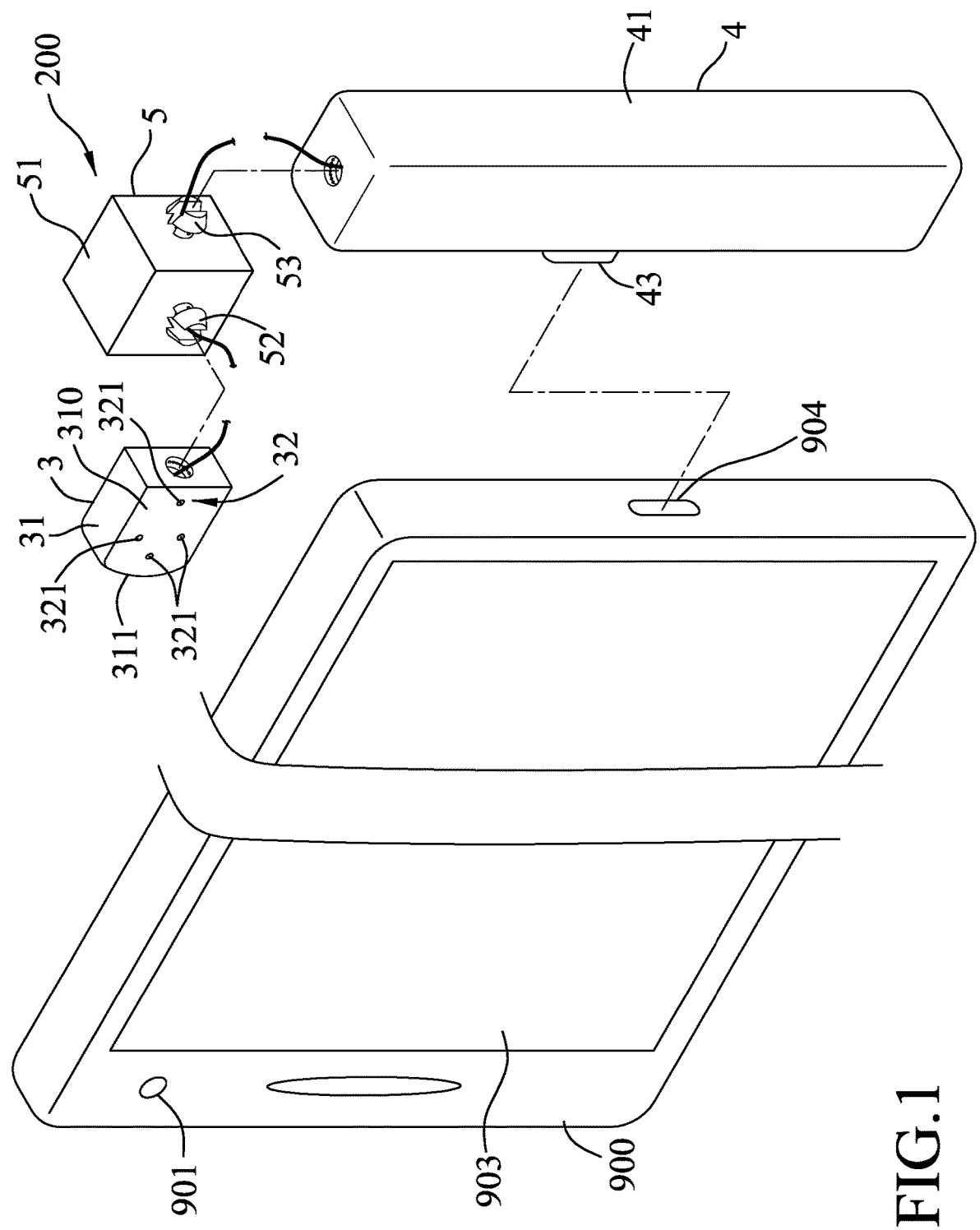
FIG. 1 is an exploded perspective view illustrating an audio transducer device of a first embodiment of an audio transducer system according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
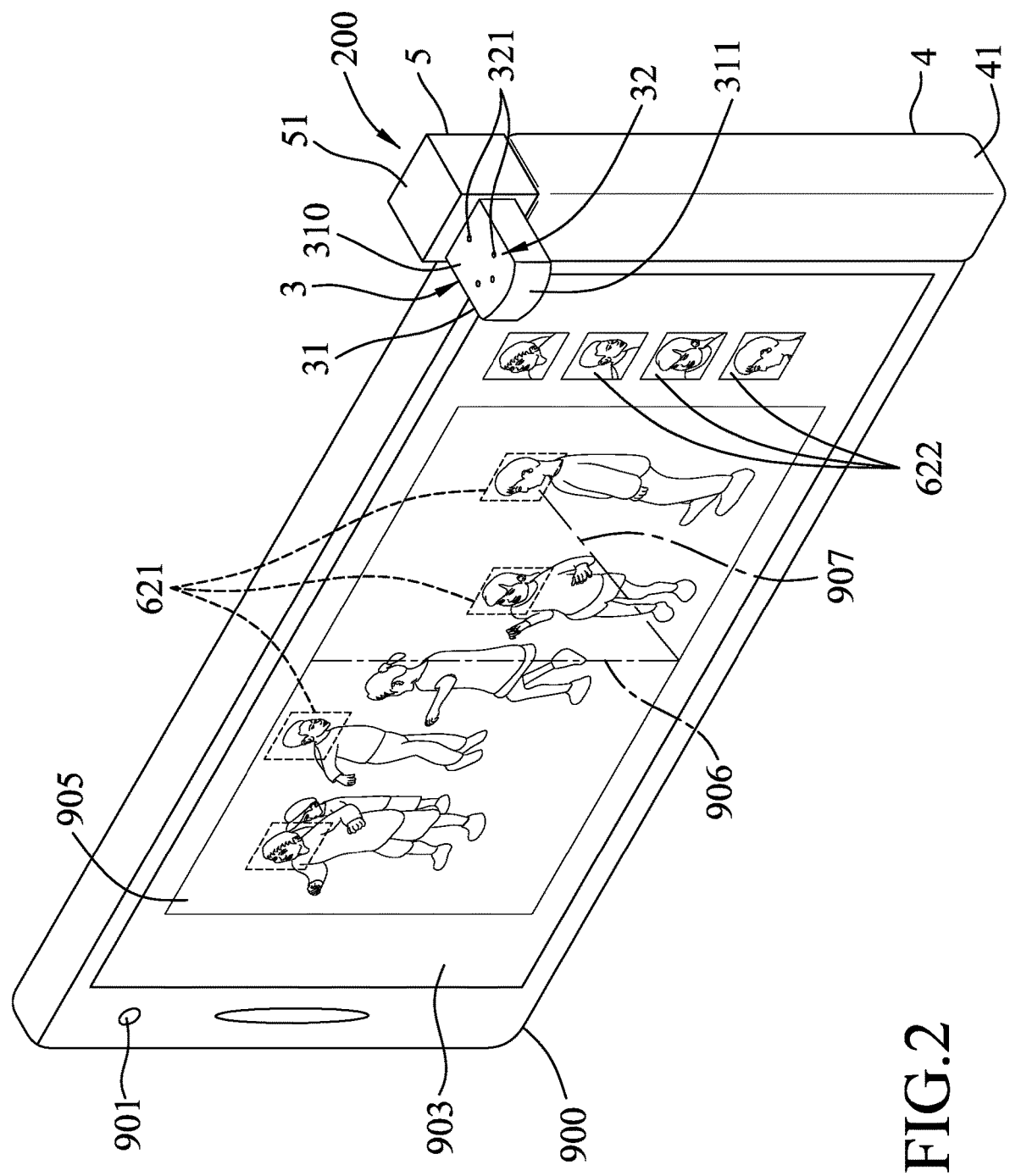
FIG. 2 is a perspective view illustrating the audio transducer device of the first embodiment installed on an electronic device which is placed in a landscape mode wherein the electronic device displays a captured image in which some persons are marked, and that also displays character icons corresponding to the marked persons.
Figure 3:
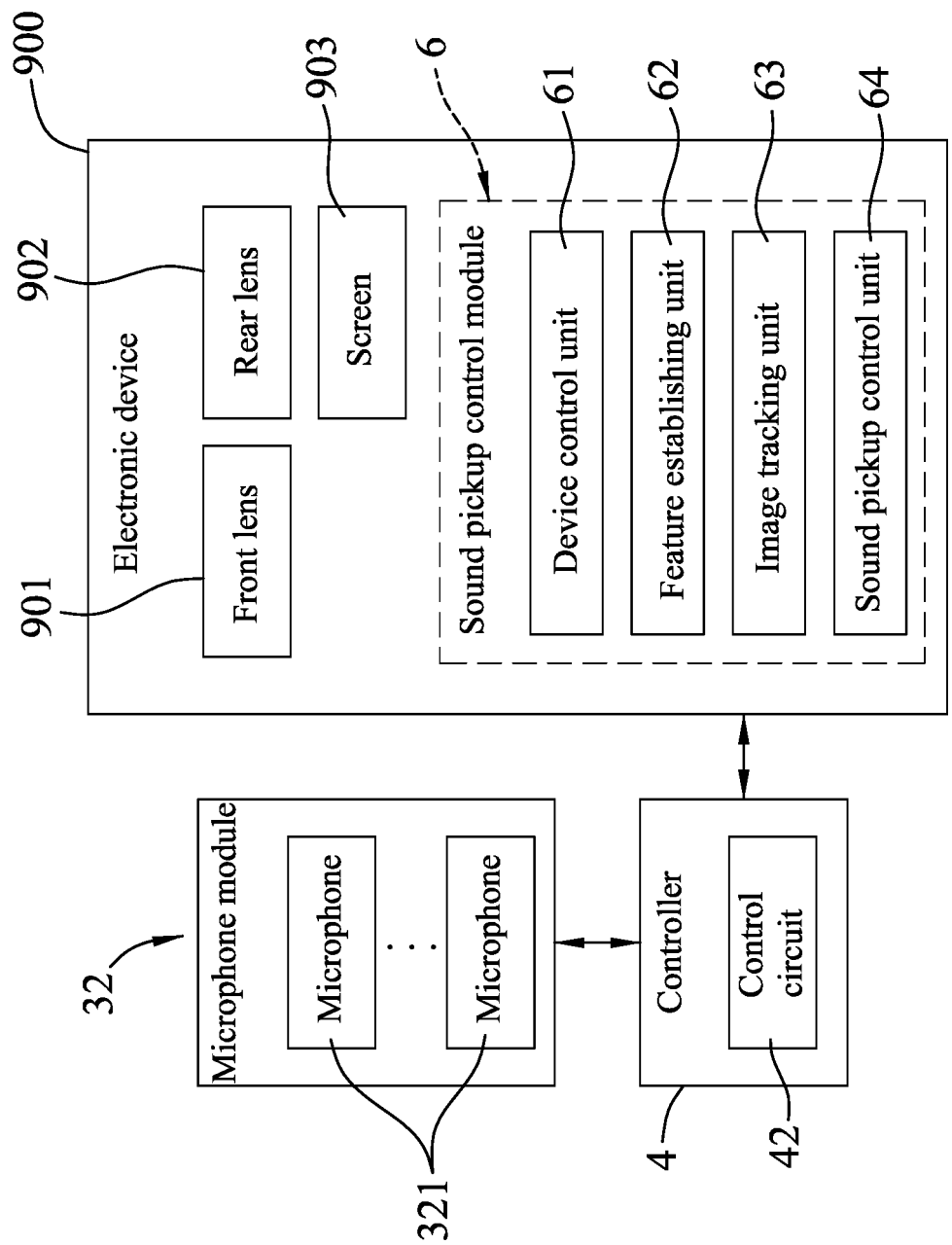
FIG. 3 is a block diagram of the first embodiment.

Referring to FIGS. 1 to 3, a first embodiment of the audio transducer system according to this disclosure is adapted for use with an electronic device 900. The electronic device 900 is exemplified to include a front lens 901 and a rear lens 902 that are capable of capturing images, a screen 903 for displaying the images captured by the front lens 901 and the rear lens 902, and a transmission terminal 904 for connection to a power source (not shown) and for data transmission. In this embodiment, the electronic device 900 may be a mobile phone, a tablet computer, a camera, a video recorder, or other devices that can perform image capture, image display, and sound recording functionalities. In some embodiments, the electronic device 900 may only be capable of sound recording. However, according to this disclosure, the electronic device 900 is not limited to those listed above.

The audio transducer system includes an audio transducer device 200 that is to be detachably mounted to the electronic device 900, and a sound pickup control module 6. In this embodiment, the sound pickup control module 6 may be a software program (e.g., a mobile application, but this disclosure is not limited in this respect) to be installed in the electronic device 900 for controlling, when executed by the electronic device 900, operation of the audio transducer device 200.

The audio transducer device 200 includes an audio transducer 3, a controller 4 that is to be detachably mounted and communicatively connected to the electronic device 900, and a direction adjusting mechanism 5 that interconnects the audio transducer 3 and the controller 4 in such a way that the audio transducer 3 is rotatable relative to the controller 4.

The audio transducer 3 is electrically connected to the controller 4 via, for example but not limited to, a signal wire that extends through the direction adjusting mechanism 5, and includes a transducer shell 31 that is rotatably mounted to the direction adjusting mechanism 5, and a microphone module 32 that is disposed in the transducer shell 31. The transducer shell 31 has a sound receiving surface 310 formed with multiple sound collecting holes, and a directional side 311 distant from the direction adjusting mechanism 5. The microphone module 32 includes multiple microphones 321 that are arranged in position to correspond to the sound collecting holes. The microphones 321 can be controlled by the controller 4 using a beamforming technology to cooperatively perform directional sound reception.

In this embodiment, the microphone module 32 includes four microphones 321 arranged in such a way that, when the microphones 321 are divided into two groups, the two groups are not in point symmetry. However, this disclosure is not limited to a specific quantity of the microphones 321, and the microphones 321 may be arranged in a symmetric pattern (e.g., a square, a rectangle, etc.) in some embodiments. In some embodiments, the microphone module 32 may include other numbers of microphones 321, such as three, five, six, or more microphones 321, which are arranged non-collinear in order to identify a direction the sound comes from. Usually, more identifying the direction the sound comes from.

The controller 4 includes a controller shell 41 that is capable of being rotatably mounted to the direction adjusting mechanism 5, a control circuit 42 that is disposed in the controller shell 41 and communicatively connected to the microphone module 32, and a signal terminal 43 that projects from and is fixed to the controller shell 41 and that is communicatively connected to the control circuit 42. The controller 4 can be detachably mounted to the electronic device 900 by detachably inserting the signal terminal 43 of the controller 4 into the transmission terminal 904 of the electronic device 900, so the controller 4 can, through the signal terminal 43 and the transmission terminal 904, acquire electric power that is required for operation, and perform data transmission between the control circuit 42 and the electronic device 900.

In some embodiments, the signal terminal 43 may conform to universal serial bus (USB) type-B, USB type-C, Lightning, etc. In this disclosure, the signal terminal 43 is not limited to a specific type, as long as the signal terminal 43 is compatible with the transmission terminal 904.

The control circuit 42 is configured to acquire a sound reception direction from a direction data piece received from the electronic device 900, to use, for example but not limited to, the beamforming technology to enhance sound reception capability of the microphones 321 with respect to the sound reception direction, so the microphones 321 cooperatively perform directional sound reception to pick up sound coming from the sound reception direction, and to obtain audio data by performing signal processing, for example but not limited to, filtering, noise reduction, voice extraction, etc., on sound received from the microphones 321. The control circuit 42 then transmits the audio data to the electronic device 900 for use or storage thereby.

The direction adjusting mechanism 5 includes a body 51, a first adaptation component 52 and a second adaptation component 53. The first adaptation component 52 is connected between the body 51 and the transducer shell 31 in such a way that the transducer shell 31 is rotatable relative to the body about a central axis of the first adaptation component 52. The second adaptation component 53 is connected between the body 51 and the controller shell 41 in such a way that the body 51 is rotatable relative to the controller shell 41 about a central axis of the second adaptation component 53. By virtue of such configuration, the sound receiving surface 310 of the audio transducer 3 can be rotated to a position where a normal direction of the sound receiving surface 310 and an image capturing direction of the electronic device 900 form an angle as desired or determined by a user between the normal direction of the sound receiving surface 310 and an image capturing direction of the electronic device 900.

In this embodiment, each of the first adaptation component 52 and the second adaptation component 53 is structured as an annular snap joint that makes two components interconnected thereby capable of performing 360-degree rotation relative to each other, and central axes of the first adaptation component 52 and the second adaptation component 53 are transverse (orthogonal in this embodiment) to each other. The first adaption component 52 has a first end that is fixedly mounted to the body 51, and a second end that is inserted into the transducer shell 31 in such a way that the body 51 is engaged to the transducer shell 31, is rotatable relative to the transducer shell 31 about the central axis of the first adaption component 52 and can be positioned at a specific position relative to the transducer shell 31. The second adaption component 53 has a first end that is fixedly mounted to the body 51, and a second end that is inserted through an adaption surface of the controller shell 41 into the controller shell 41 in such a way that the body 51 is engaged to the controller shell 41, is rotatable relative to the controller shell 41 about the central axis of the second adaption component 53 and can be positioned at a specific position relative to the controller shell 41. In this embodiment, the adaption surface of the controller shell 41 is adjacent to a surface of the controller shell 41 to which the signal terminal 43 is mounted, and has a normal direction that is orthogonal to an image capturing direction of the electronic device 900.

In practice, positioning between the first adaption component 52 and the transducer shell 31 and positioning between the second adaption component 53 and the controller shell 41 can be realized by, for example, engagement connection between male and female engaging members, such as teeth and grooves, protrusion and recess, etc., or by virtue of frictional contact between the two components. The method and structure to achieve positioning between two components should be well known to those skilled in the art, so details thereof are omitted herein for the sake of brevity, and this disclosure is not limited in this respect.

FIG. 2 exemplarily shows a case where the audio transducer device 200 is connected to the electronic device 900 that captures images using the front lens 901 in a landscape mode, and where the audio transducer device 200 is disposed at a right side of the electronic device 900. By virtue of the direction adjusting mechanism 5, the audio transducer 3 and the body 51 of the direction adjusting mechanism 5 can be rotated relative to the electronic device 900 in such a way that the audio transducer 3 is rotated to a position where the directional side 311 faces a front direction of the electronic device 900, and where the sound receiving surface 310 is substantially horizontal and faces upward or downward. In such a condition, the audio transducer 3 can be controlled by the controller 4 to perform directional sound reception to pick up sound coming from a horizontal direction within a range covered by an image 905 that is captured by the electronic device 900 (referred to as captured image 905 herein). It is noted that the captured image 905 may be captured using the front lens 901 in some embodiments, and may be captured using the rear lens 902 in other embodiments, and this disclosure is not limited in this respect.

Figure 4:
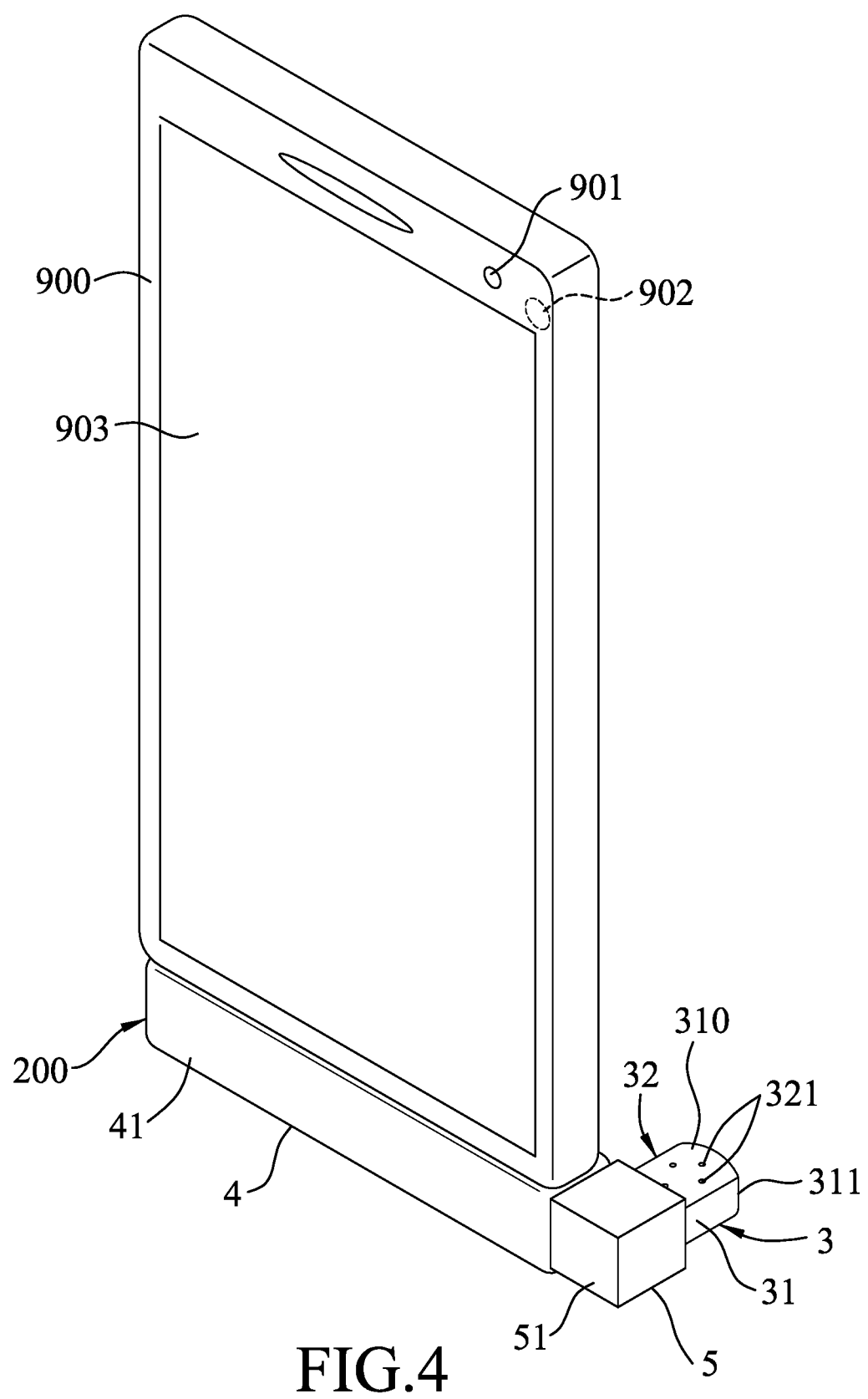
FIG. 4 is a perspective view illustrating the audio transducer device of the first embodiment installed on the electronic device which is placed in a portrait mode.

FIG. 4 exemplarily shows a case where the audio transducer device 200 is connected to the electronic device 900 that captures images using the rear lens 902 in a portrait mode, and where the audio transducer device 200 is disposed at a bottom side of the electronic device 900. The audio transducer 3 and the body 51 of the direction adjusting mechanism 5 can be rotated relative to the electronic device 900 in such a way that the audio transducer 3 is rotated to a position where the directional side 311 faces a rear direction of the electronic device 900, and where the sound receiving surface 310 is substantially horizontal and faces upward or downward. In such a condition, the audio transducer 3 can be controlled by the controller 4 to perform directional sound reception to pick up sound coming from a horizontal direction within a range covered by an image that is captured by the rear lens 902 and displayed on the screen 903.

When the sound receiving surface 310 is substantially horizontal, a normal direction of the sound receiving surface 310 and the image capturing direction of the electronic device 900 are substantially orthogonal to each other, and the microphones 321 would sense the sound coming from the sound reception direction at different time points, so the audio transducer 3 can be controlled by the controller 4 to perform directional sound reception using the beamforming technology. In practice, the sound receiving surface 310 of the audio transducer 3 is not required to be completely horizontal (e.g., it is not necessary for the normal direction of the sound receiving surface 310 to be completely orthogonal to the image capturing direction), and can be rotated relative to the first adaption component 52 to a slanted position, as long as the microphones 321 can sense the sound from the sound reception direction at different time points.

Referring to FIGS. 2 and 3, the sound pickup control module 6 includes a device control unit 61, a feature establishing unit 62, an image tracking unit 63 and a sound pickup control unit 64.

The device control unit 61 detects, via the electronic device 900, whether the transmission terminal 904 has been communicatively connected to the audio transducer device 200. Upon determining that the electronic device 900 has been communicatively connected to the audio transducer device 200, the device control unit 61 controls the electronic device 900 to turn off a sound reception function of a microphone built in the electronic device 900, and to switch to use the audio transducer device 200 as a sound reception device that acquires the sound for media programs that are currently executed. The media programs may include but not limited to, for example, social media programs, live broadcast programs, video recording programs, photographing programs, audio recording programs, etc.

The feature establishing unit 62 may use face recognition technology to analyze the captured image 905 and recognize human faces in the captured image 905 that is currently displayed on the screen 903, and to use a pattern 621 to mark out the human faces thus recognized in the captured image 905. For example, the feature establishing unit 62 may generate dotted frames that respectively encircle the human faces thus recognized, so a user of the electronic device 900 can know which human face in the captured image 905 is recognizable by the feature establishing unit 62. When a user operates the electronic device 900 to select one of the human faces that are marked by the pattern 621 by, for example but not limited, touch operation on the screen 903 or triggering particular buttons, the feature establishing unit 62 analyzes the person that corresponds to the selected one of the human faces (referred to as selected person) in the captured image 905 to obtain overall features of the selected person, and establishes and stores a set of feature parameters (referred to as feature parameter set) for the selected person in the electronic device 900. The overall features may include but not limited to, haircut, face shape, facial features (eyes, ears, nose, mouth, eyebrows, etc.), clothes and/or accessories the person is wearing, body type/shape, etc.

Further, the feature establishing unit 62 may take a snapshot for each of the persons whose feature parameter set has already been established to generate a character icon 622 that corresponds to the feature parameter set of the person, and causes the electronic device 900 to display the character icons 622 of the persons beside the captured image 905 on the screen 903.

In some embodiments, the feature parameter sets that were established for some persons may be pre-stored in the electronic device 900. In such a scenario, when the electronic device 900 starts to capture images, the feature establishing unit 62 may directly identify whether the captured image 905 contains any person that corresponds to one of the feature parameter sets. Upon finding that a person corresponding to one of the feature parameter sets is contained in the captured image 905, the feature establishing unit 62 may immediately cause the electronic device 900 to display a character icon 622 that corresponds the person thus found on the screen 903, and the step of establishing the feature parameter set may be omitted.

When one of the character icons 622 displayed on the screen 903 is selected, the image tracking unit 63 may analyze, based on the feature parameter set that corresponds to the selected one of the character icons 622, the captured image 905 that is currently being displayed on the screen 903 to identify in the captured image 905 a target person that corresponds to the selected one of the character icons 622. Then, the image tracking unit 63 may track a position of the target person in the captured image 905 in real time to obtain a direction data piece that corresponds to the target person. The direction data piece includes, for example but not limited to, a lateral distance between the position of the target person and a central line 906 that extends through a center of the captured image 905 in a vertical direction (with the vertical direction being dependent upon the orientation of the electronic device 900 at the time), an angle formed between the central line 906 and an extension line 907 that extends from a bottom of the central line 906 to the position of the target person, coordinates of the position of the target person in a coordinate system defined with respect to the captured image 905, and so on.

The sound pickup control unit 64 transmits the direction data piece to the controller 4, and the control circuit 42 of the controller 4 acquires the sound reception direction from the direction data piece received from the electronic device 900, uses the beamforming technology to enhance sound reception capability of the microphones 321 with respect to the sound reception direction. As a result, the microphones 321 cooperatively perform directional sound reception to pick up sound coming from the sound reception direction. Then, the control circuit 42 obtains audio data by performing signal processing on the sound received from the microphones 321, and transmits the audio data to the electronic device 900. The sound pickup control unit 64 controls the electronic device 900 to use the audio data as an audio input for the media programs that are currently being used.

In this embodiment, the sound pickup control module 6 is installed in the electronic device 900, and the controller 4 is communicatively connected to the electronic device 900 by inserting the signal terminal 43 into the transmission terminal 904 of the electronic device 900 when the audio transducer device 200 is used with the electronic device 900. The audio transducer 3 and the direction adjusting mechanism 5 can be rotated based on the image capturing direction of the electronic device 900. For example, when the electronic device 900 is in the portrait mode, the audio transducer 3 and the body 51 of the direction adjusting mechanism 5 can be rotated in such a way that the directional side 311 faces toward the image capturing direction of the electronic device 900, and the sound receiving surface 310 is horizontal and faces upwardly or downwardly.

When the electronic device 900 executes a media program that requires image capturing and sound capturing, the sound pickup control module 6 controls the electronic device 900 to turn off the microphone built in the electronic device 900 and to switch to use the audio transducer device 200 for sound reception. When the electronic device 900 starts to capture images, the sound pickup control module 6 begins to analyze the captured image 905 and mark human faces in the captured image 905 using the patterns 621. After the user selects some human faces that are marked by the patterns 621, the sound pickup control module 6 performs feature analysis on the selected persons to establish and store feature parameter sets that correspond to the selected persons, and makes the electronic device 900 display the character icons 622 that correspond to the feature parameter sets. In the case that the electronic device 900 has the feature parameter sets pre-stored therein, the sound pickup control module 6 would directly use the feature parameter sets to analyze persons in the captured image 905, and, upon finding that a person corresponding to one of the feature parameter sets is captured by the captured image 905, control the electronic device 900 to display the character icon 622 that corresponds to the person thus found on the screen 903.

When the user intends to track the sound reception with respect to one of the persons (referred to as target person) in the captured image 905, the user may select the character icon 622 that corresponds to the target person, so as to make the sound pickup control module 6 track, based on the feature parameter set that corresponds to the selected character icon 622, a position of the target person in the captured image 905 to obtain the direction data piece that corresponds to the target person, and transmit the direction data piece to the audio transducer device 200. The audio transducer device 200 calculates a sound reception direction based on the direction data piece, and uses beamforming technology to control the microphone module 32 to perform directional sound reception and voice extraction with respect to sound coming from the sound reception direction to acquire audio data. Then, the audio transducer device 200 transmits the audio data to the electronic device 900 for use or storage by the media program.

By virtue of the sound pickup control module 6 that tracks the position of the target person based on the corresponding feature parameter set and that controls the audio transducer device 200 to perform directional sound reception to pick up sound coming from a direction corresponding to the target person, the voice of the target person can be effectively captured without moving or rotating the electronic device 900. As a result, once a live broadcaster has the electronic device 900 set up at a spot, the live broadcaster can move freely in front of the lens that captures images as desired while, as an example, introducing tourist attractions and/or products, because the audio transducer device 200 can correctly perform tracked sound reception to pick up sound coming from the direction of the live broadcaster even if there are other people talking nearby. In other words, the live broadcaster will not be limited to standing in a fixed direction (e.g., the dead-front direction) from the lens of the electronic device 900 while broadcasting.

It is noted that, in the first embodiment, each of the first adaption component 52 and the second adaption component 53 is structured as an annular snap joint that can be inserted into the corresponding one of the transducer shell 31 and the controller shell 41 while allowing for relative rotation between the body 51 of the direction adjusting mechanism 5 and the shell 31/41, so the audio transducer 3 can be rotated to face the front side or the rear side of the electronic device 900, and the sound receiving surface 310 can be rotated to be horizontal ("horizontal" is a directional expression that may change depending on whether the electronic device 900 is in the portrait or landscape mode, as is understood in an ordinarily setting) and face upward or downward ("upward" and "downward" are directional expressions that may change depending on whether the electronic device 900 is in the portrait or landscape mode, as are understood in an ordinarily setting).

In practice, multiple types of structures are capable of being used to realize the direction adjustment mechanism 5 that makes the audio transducer 3 rotatable relative to the electronic device 900 about two transverse axes. For example, universal joints, lug and pin joints, other suitable structures, or any combination thereof can also be used to interconnect the audio transducer 3 and the direction adjusting mechanism 5 to provide for the required degrees of freedom of movement, as would be readily appreciated by those skilled in the art, and this disclosure is not limited in this respect.

Figure 5:
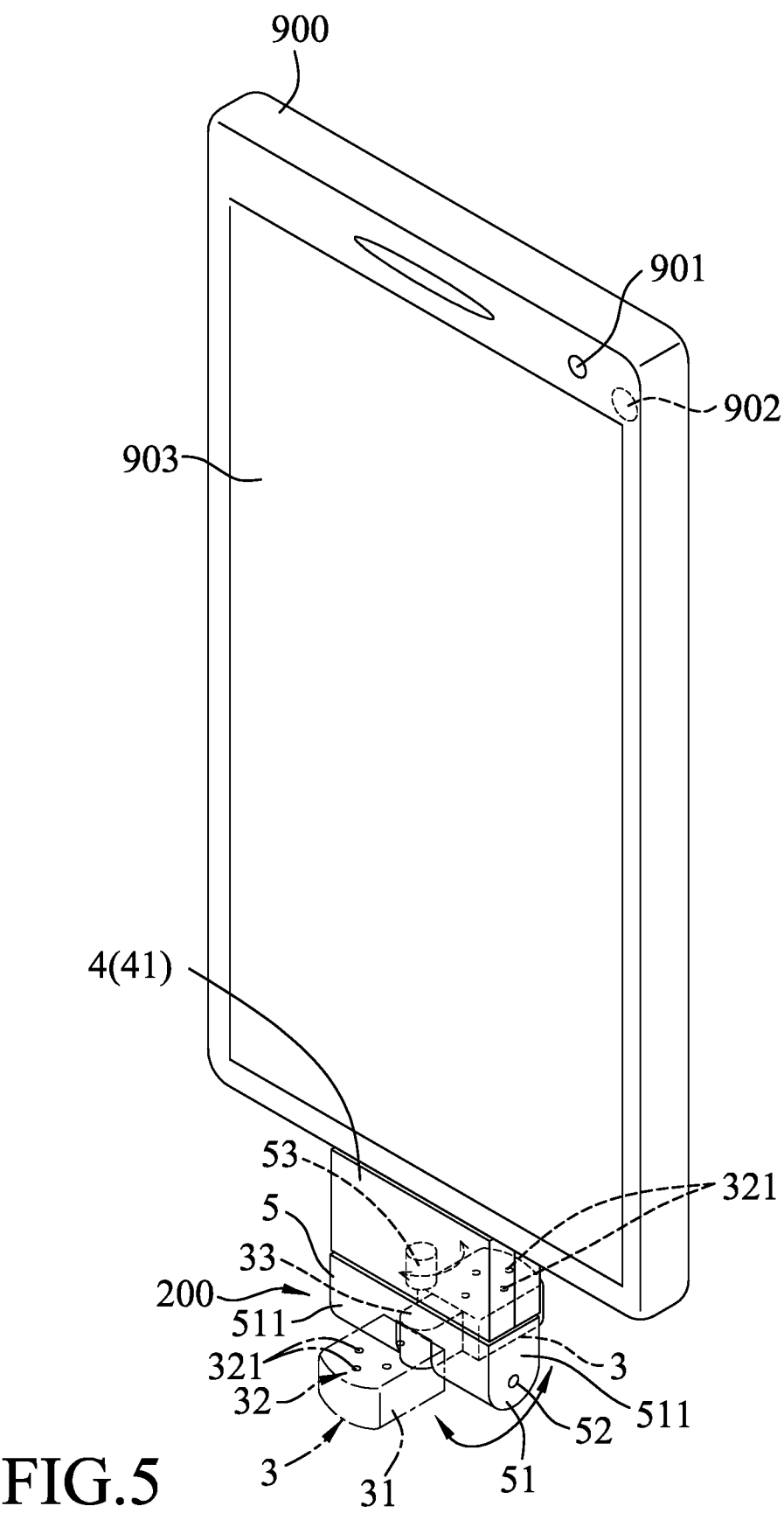
FIG. 5 is a perspective view illustrating a variation of the first embodiment installed on the electronic device.

Referring to FIG. 5, in another implementation, the adaption surface of the controller shell 41 of the controller 4 to which the direction adjusting mechanism 5 is mounted is opposite to the surface (e.g., the top surface in FIG. 5) of the controller shell 41 where the signal terminal (not shown in FIG. 5) is mounted. The second adaption component 53 is structured as a circular column that is inserted into the controller shell 41 through the adaption surface of the controller shell 41 and that allows the direction adjusting mechanism 5 to perform 360-degree rotation about the second adaption component 53 and be positioned relative to the controller shell 41, and the first adaption component 52 is structured as a pin that is pivotally connected to a male lug 33 of the audio transducer 3 and two female lugs 511 of the body 51 of the direction adjusting mechanism 5, so the transducer shell 31 can perform 180-degree pivotal movement about the first adaption component 52 and be positioned relative to the body 51. In this implementation, when the controller 4 is mounted to a bottom side or a top side of the electronic device 900, the sound receiving surface 310 of the audio transducer 3 can be pivoted to be horizontal and face upward or downward, or be slanted forward or rearward to slightly face the image capturing direction.

Figure 6:
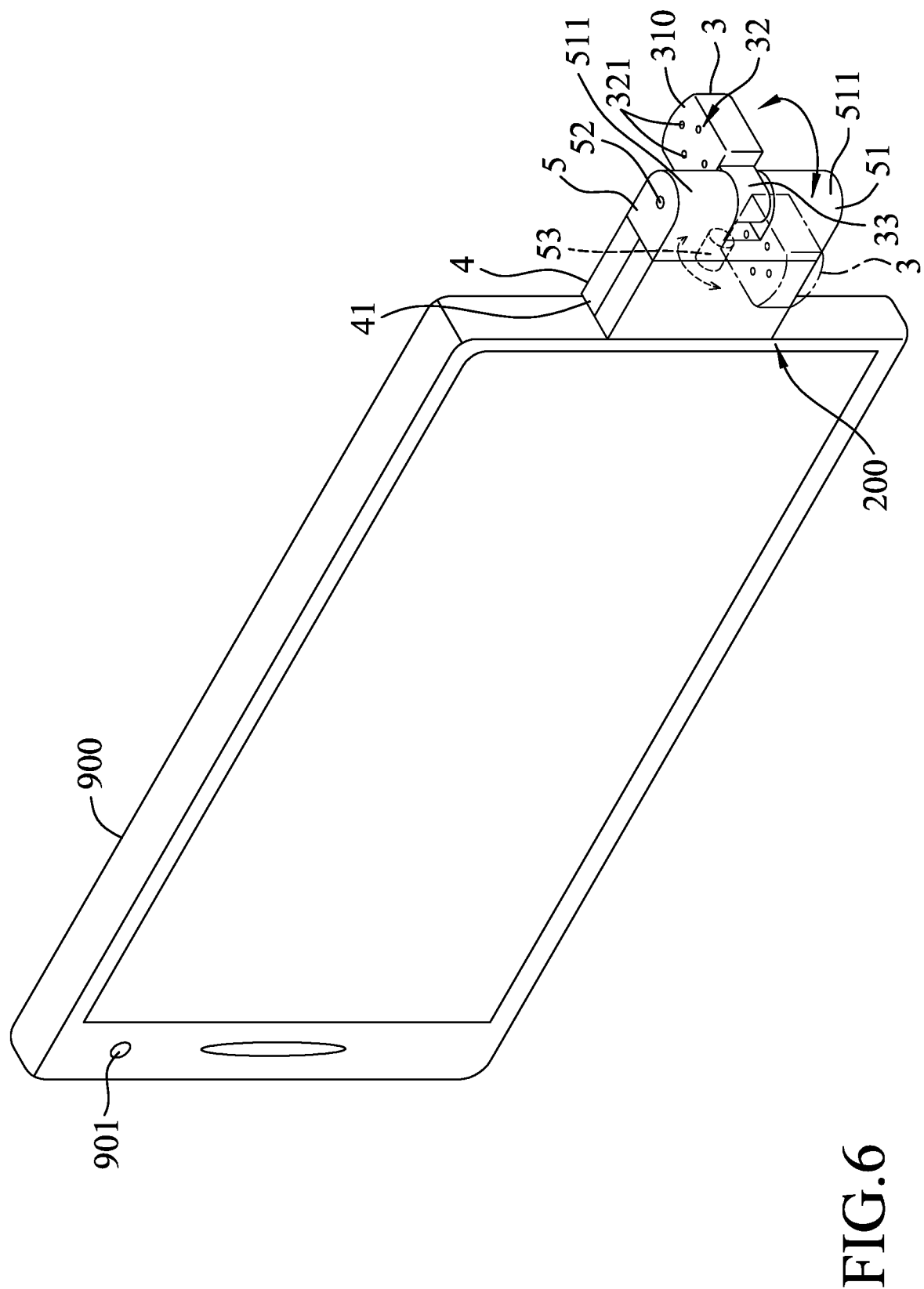
FIG. 6 is a perspective view illustrating another variation of the first embodiment installed on the electronic device.
Figure 7:
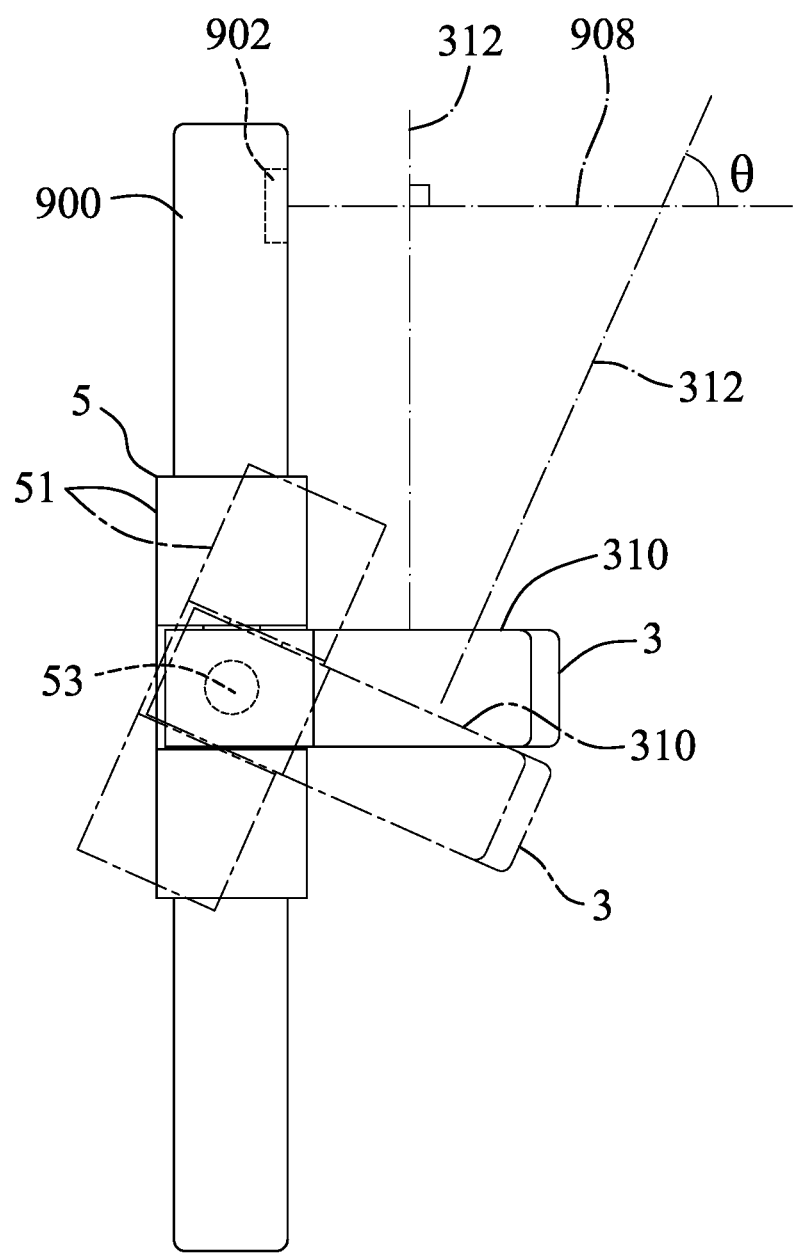
FIG. 7 is a side view of FIG. 6, illustrating that an audio transducer of the another variation is rotated to a position where a sound receiving surface thereof is not horizontal.
Figure 8:
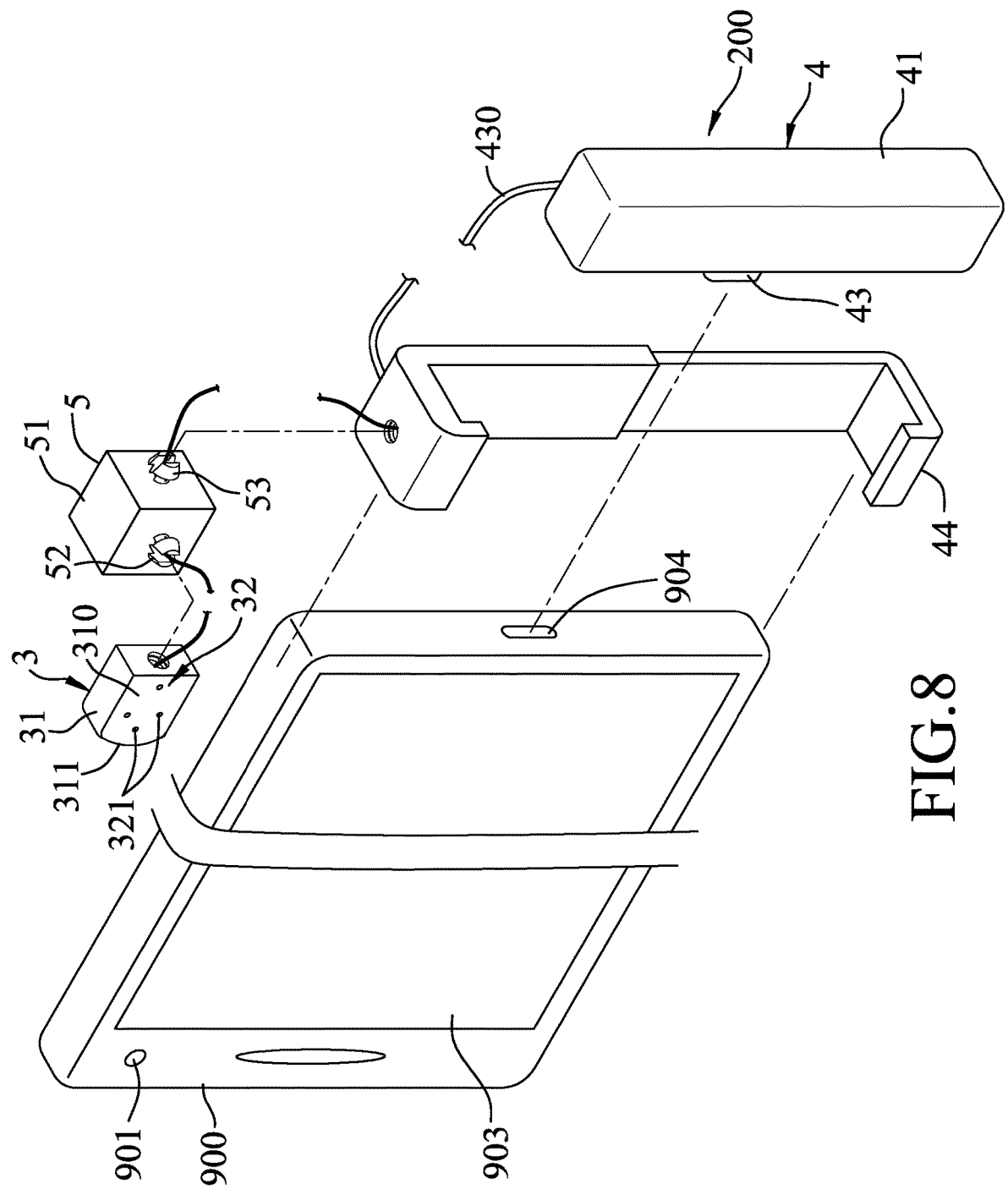
FIG. 8 is an exploded perspective, fragmentary view of an audio transducer device of a second embodiment of an audio transducer system according to the disclosure.

Referring to FIGS. 6 and 7, another implementation is shown to be different from that shown in FIG. 5 in that, in FIGS. 6 and 7, the audio transducer 3 is configured such that, when the controller 4 is mounted to a left side or a right side of the electronic device 900, the sound receiving surface 310 of the audio transducer 3 can be rotated to be horizontal and face upward or downward, or be slanted forward or rearward to slightly face the image capturing direction. For example, the audio transducer 3 can be rotated to make the normal direction 312 of the sound receiving surface 310 and the image capturing direction 908 form an angle (θ) that is desired by a user in a range between 30° and 90°, so the microphones 321 can receive the sound from the image capturing direction 908 at different time points, and thus can be controlled to perform directional sound reception using the beamforming technology.

In other embodiments, the audio transducer device 200 can acquire the direction data piece in different manners. For example, the audio transducer device 200 can use the cloud technology to receive the direction data piece resulting from a remote monitoring device (not shown) that analyzes the captured image 905. In such a scenario, the audio transducer device 200 can be used with the electronic device 900 without installation of the sound pickup control module 6 on the electronic device 900.

Referring to FIGS. 3, 8, 9 and 10, a second embodiment of the audio transducer system according to this disclosure is shown to differ from the first embodiment in the structural design of the audio transducer device 200.

In the second embodiment, the controller 4 includes an installation frame 44 that is capable of being detachably mounted to the electronic device 900, a controller shell 41, and a control circuit 42 and a signal terminal 43 that are mounted to controller shell 41. The audio transducer 3 is rotatably mounted to the installation frame 44 through the direction adjusting mechanism 5, and is communicatively connected to the controller 4 through a transmission wire 430. In some implementations, the communication between the audio transducer 3 and the controller 4 can be realized using a short-distance communication technology, such as Bluetooth®, but this disclosure is not limited in this respect.

In the second embodiment, the installation frame 44 may be an elastically expandable clamp, and can be fitted to the electronic device 900 by a restoring force of the installation frame 44. In other implementations, the installation frame 44 can be made as a hook that can be mounted to the electronic device 900 by, for example but not limited to, hanging from a top side of the electronic device 900. Many different kinds of structure are capable of making the installation frame 44 detachably mounted to the electronic device 900, and this disclosure is not limited in this respect.

Figure 9:
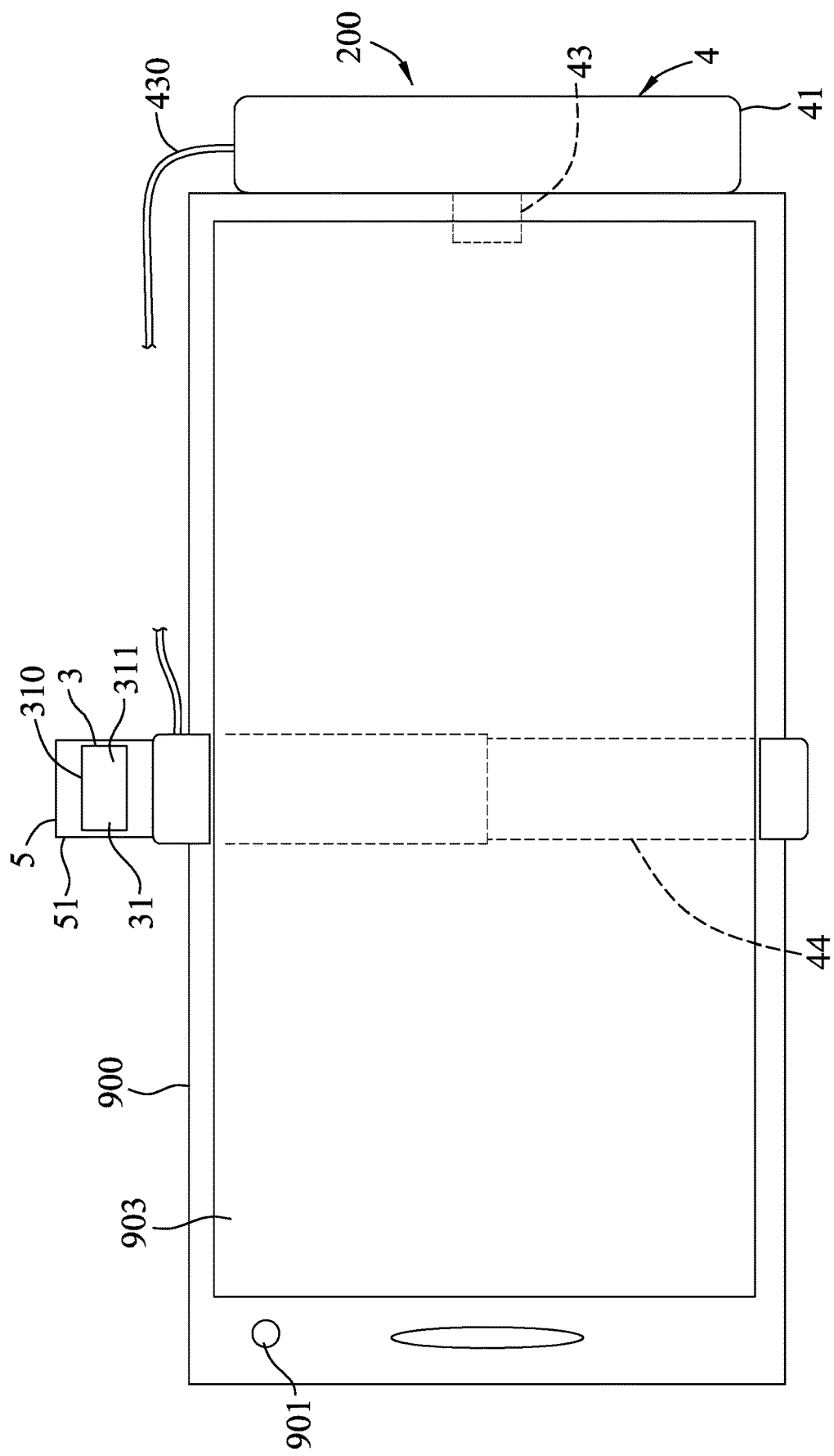
FIG. 9 is a fragmentary front view of the audio transducer device of the second embodiment installed on the electronic device.
Figure 10:
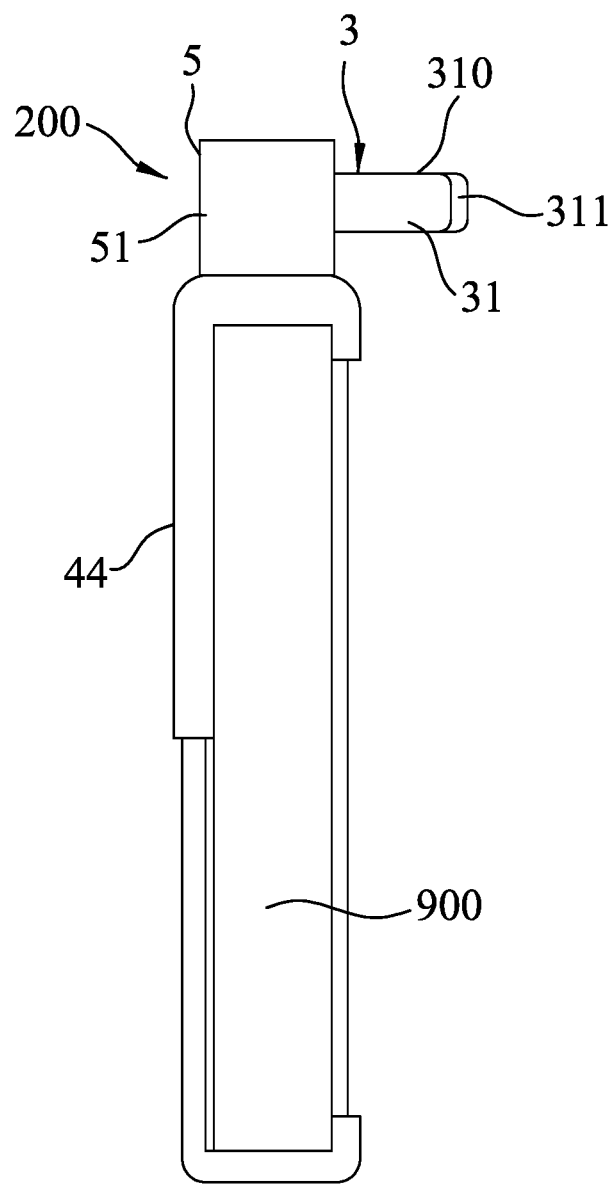
FIG. 10 is a side view of the audio transducer device of the second embodiment installed on the electronic device.
Figure 11:
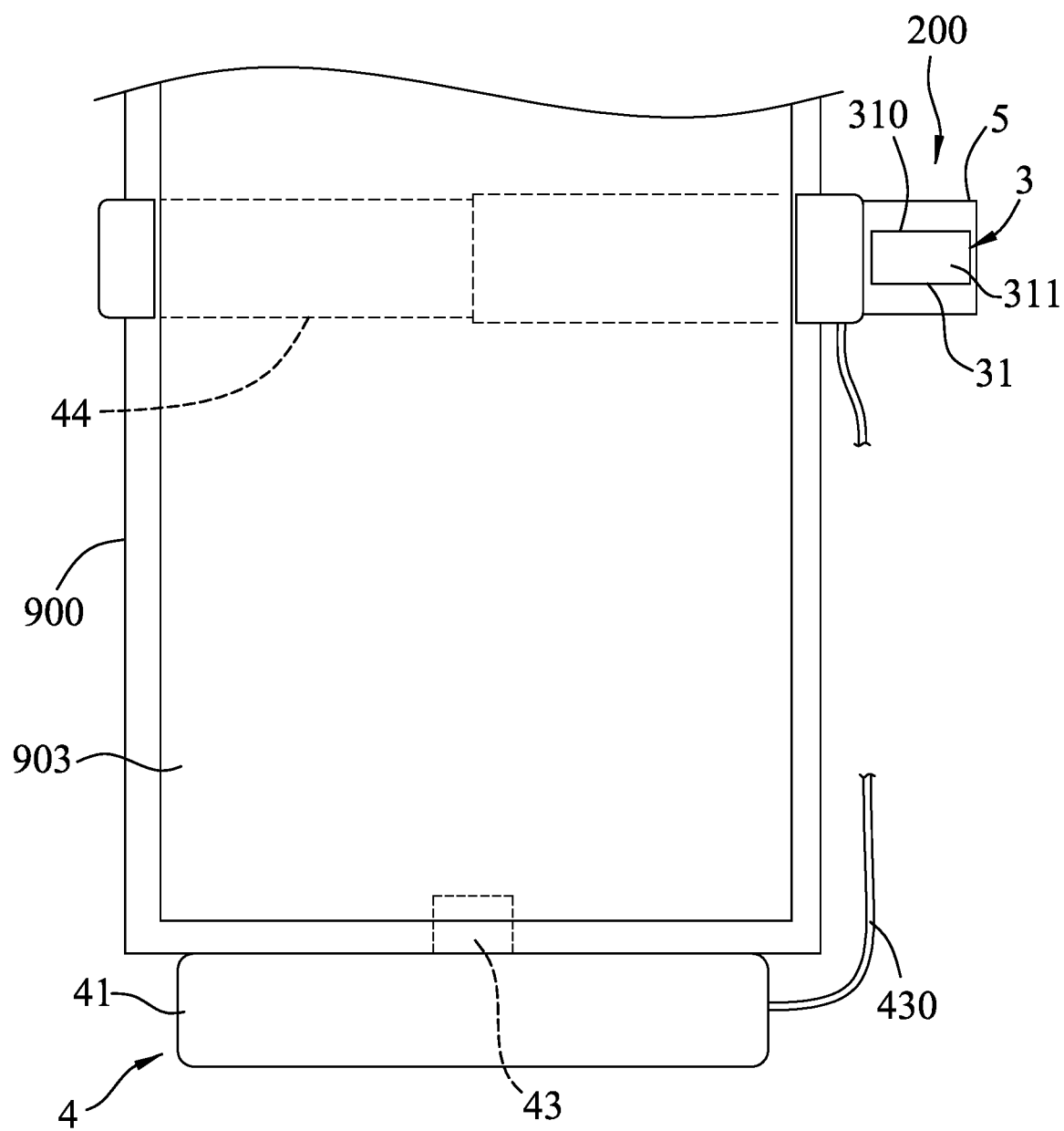
FIG. 11 is a fragmentary front view of the audio transducer device of the second embodiment installed on the electronic device that is placed in the portrait mode.
Figure 12:
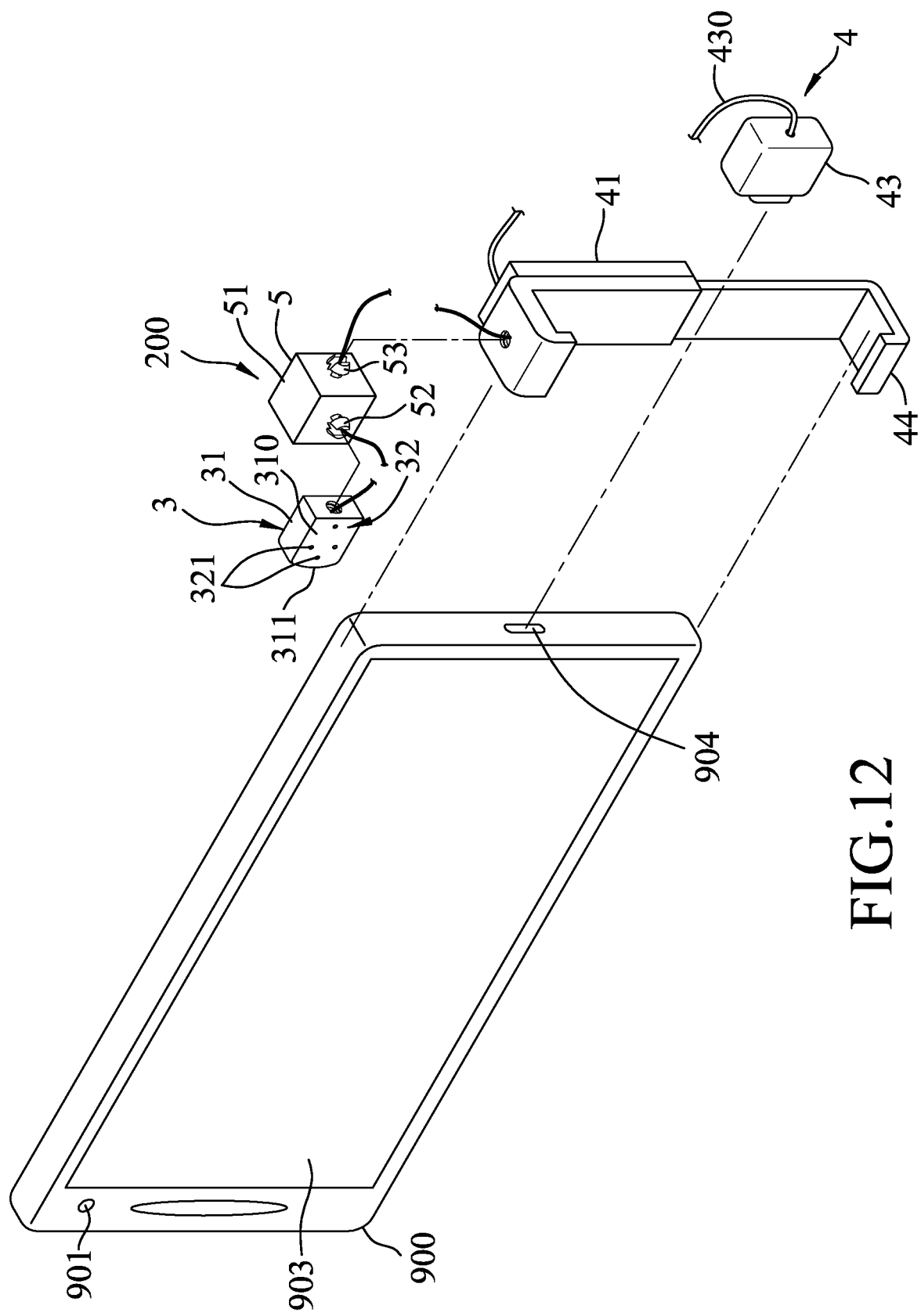
FIG. 12 is an exploded perspective, fragmentary view of an audio transducer device of a third embodiment of an audio transducer system according to the disclosure.
Figure 13:
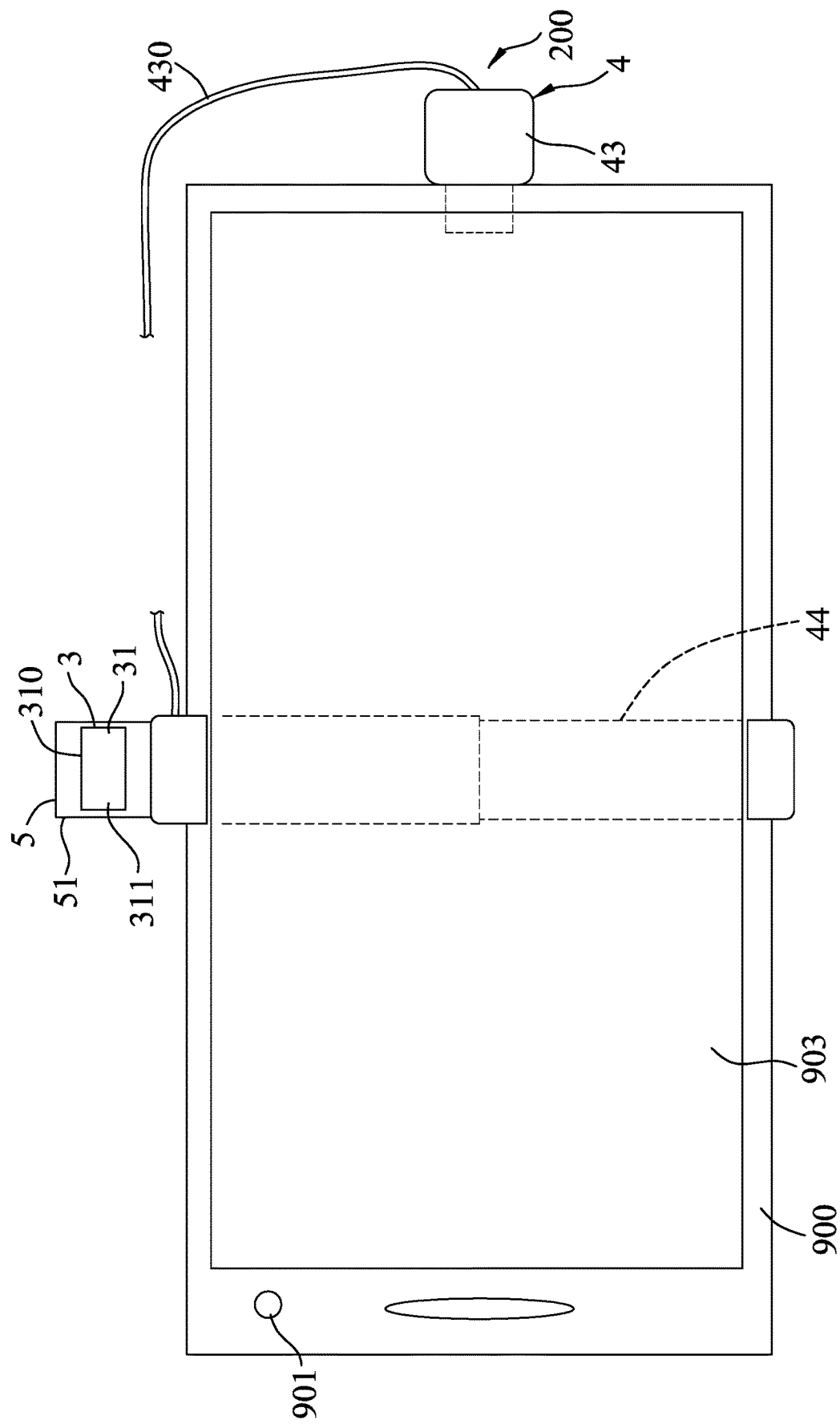
FIG. 13 is a fragmentary front view of the audio transducer device of the third embodiment installed on the electronic device that is placed in the landscape mode.
Figure 14:
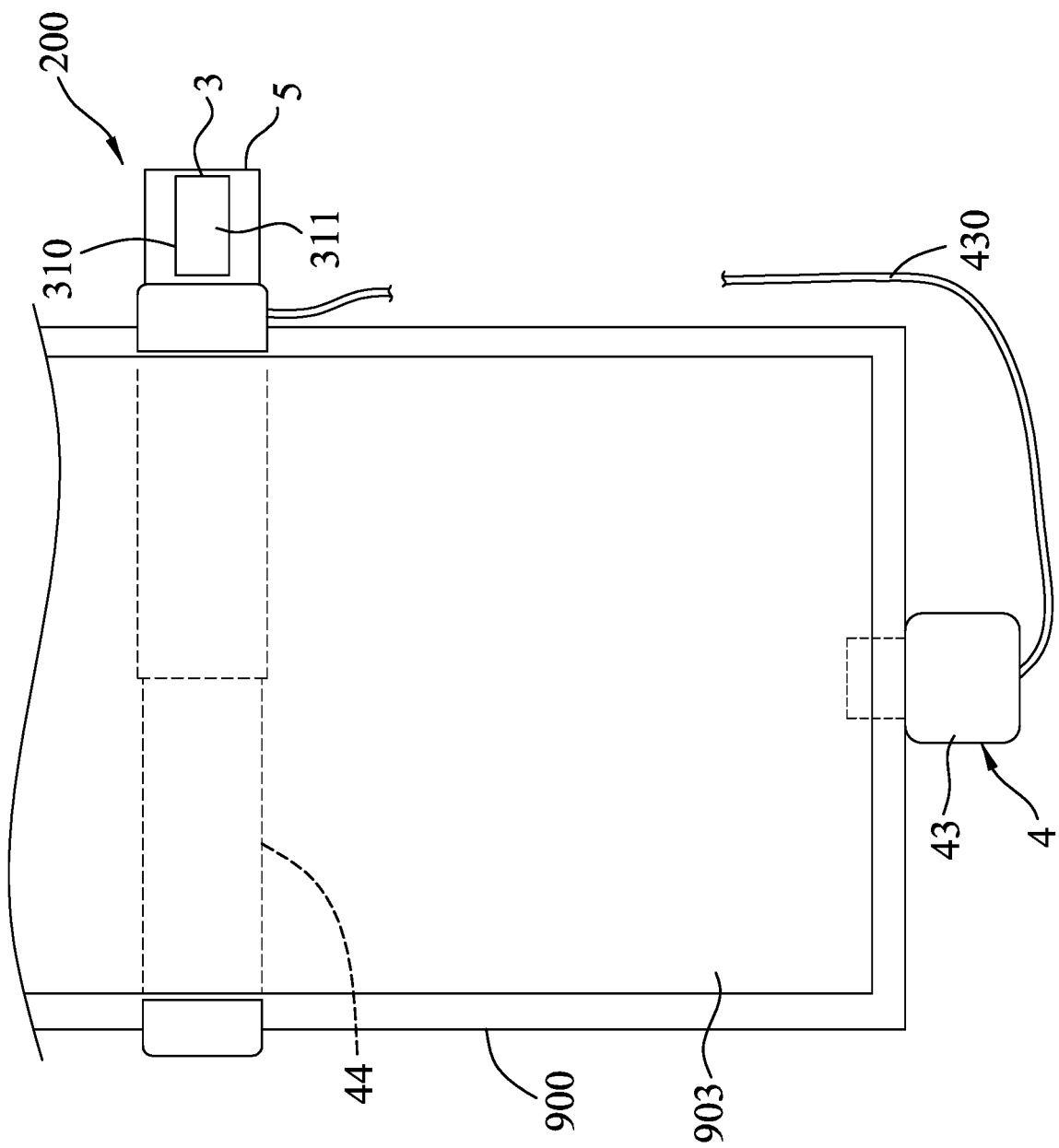
FIG. 14 is a fragmentary front view of the audio transducer device of the third embodiment installed on the electronic device that is placed in the portrait mode.

Referring to FIGS. 9, 10 and 11, when the audio transducer device 200 of the second embodiment is in use, the installation frame 44 is mounted to and positioned on the electronic device 900, and the signal terminal 43 is inserted into the transmission terminal 904 (see FIG. 8) of the electronic device 900. Then, the audio transducer 3 and the body 51 of the direction adjusting mechanism 5 can be rotated based on the image capturing direction, so that the audio transducer 3 can be controlled to perform directional sound reception to pick up sound coming from the scene of the captured image 905.

Referring to FIGS. 3, 12, 13 and 14, a third embodiment of the audio transducer system according to this disclosure is shown to differ from the second embodiment in the structural design of the audio transducer device 200.

In the third embodiment, the control circuit 42 is disposed in the controller shell 41, and the controller shell 41 is fixed to the installation frame 44. The signal terminal 43 is separate from the controller shell 41 and is electrically connected to the control circuit 42 through the transmission wire 430 that extends into the controller shell 41.

When the audio transducer device 200 of the third embodiment is in use, the installation frame 44 is mounted to and positioned on the electronic device 900, and the signal terminal 43 is inserted into the transmission terminal 904 of the electronic device 900. Then, the audio transducer 3 and the body 51 of the direction adjusting mechanism 5 can be rotated based on the image capturing direction, so that the audio transducer 3 can be controlled to perform directional sound reception to pick up sound coming from the scene of the captured image 905.

In some implementations, the communication between the controller 4 and the electronic device 900 can be realized using short-distance communication technology for transmission of the audio data and the direction data piece, so the signal terminal 43 can be omitted.

In some implementations, the direction adjusting mechanism 5 can be configured such that only the audio transducer 3 is rotatable. In such a scenario, the body 51 is fixed to the controller shell 41 or the installation frame 44, and only interconnection between the body 51 and the audio transducer 3 via the first adaption component 52 allows the audio transducer 3 to rotate relative to the body 51, and in turn also relative to the electronic device 900 (e.g., 180-degree rotation, 360-degree rotation or three-dimensional rotation), and the sound receiving surface 310 can thus be adjusted with respect to the electronic device 900.

In summary, when the audio transducer device 200 is connected to the electronic device 900, the microphones 321 are used in place of the microphone built in the electronic device 900 to receive sound. The structural design of the audio transducer 3, the controller 4 and the direction adjusting mechanism 5 makes the audio transducer 3 rotatable or pivotable relative to the electronic device 900, so the sound receiving surface 310 can be adjusted to make the microphones 321 receive the sound from the image capturing direction at different time points, and the controller 4 can thus use the beamforming technology to control the microphones 321 to perform directional sound reception to pick up sound coming from the sound reception direction.

Furthermore, the sound pickup control module 6 is configured to be installed in the electronic device 900 for controlling operation of the audio transducer device 200, and to analyze character features of the persons in the captured image 905 for establishing the feature parameter sets for those persons. The feature parameter sets can be used to continuously track a target person in the captured image 905 and thus generate the direction data piece that corresponds to the target person. In real time, the sound pickup control module 6 transmits the direction data piece to the audio transducer device 200, and controls the audio transducer device 200 to perform directional sound reception with respect to the target person based on the direction data piece. As a result, the tracking directional sound reception can be automatically performed with respect to the target person without adjusting the electronic device 900 to place the target person at a fixed position (e.g., middle) in the captured image 905, so as to solve the problem as described for the first type of conventional microphones, which is that the target has to be at the fixed position in the captured image, and to solve the problem as described for the second type of conventional microphones, which simply performs sound reception to pick up sound coming from a direction with the greatest voice energy.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An audio transducer device, comprising:
    an audio transducer that includes a transducer shell having a sound receiving surface formed with multiple sound collecting holes, and a microphone module disposed in said transducer shell and including multiple microphones, wherein the microphones correspond in position to said sound collecting holes of said sound receiving surface for receiving sound;
    a controller that is to be detachably mounted and communicatively connected to an electronic device capable of capturing images and that is communicatively connected to said audio transducer, said controller being configured to control said microphones to cooperatively perform directional sound reception to obtain audio data that is to be transmitted to the electronic device; and
    a direction adjusting mechanism that interconnects said transducer shell and said controller in such a way that said transducer shell is rotatable relative to said controller for rotating said sound receiving surface to a position where a normal direction of said sound receiving surface and an image capturing direction of the electronic device form an angle as desired by a user therebetween.

2. The audio transducer device of claim 1, wherein said controller includes:
    a controller shell;
    a control circuit that is disposed in said controller shell and that is configured to control said microphones to cooperatively perform directional sound reception; and
    a signal terminal that is electrically connected to said control circuit, that projects from and is fixed to said controller shell, and that is to be inserted into a transmission terminal of the electronic device for communication with the electronic device;
    wherein said direction adjusting mechanism is connected between said controller shell and said transducer shell.

3. The audio transducer device of claim 2, wherein said direction adjusting mechanism includes a body that is fixed to said controller shell, and an adaption component that is connected between said body and said transducer shell to allow said transducer shell to be rotatable relative to said body.

4. The audio transducer device of claim 2, wherein said direction adjusting mechanism includes:
    a body;
    a first adaption component that is connected between said transducer shell and said body to allow said transducer shell to be rotatable relative to said body about a central axis of said first adaption component; and
    a second adaption component that is connected between said controller shell and said body to allow said body to be rotatable relative to said controller shell about a central axis of said second adaption component;

wherein the central axis of said first adaption component is transvers to the central axis of said second adaption component.

5. The audio transducer of claim 1, wherein said controller includes:
a controller shell;
a control circuit that is disposed in said controller shell and that is configured to control said microphones to cooperatively perform directional sound reception;
a signal terminal that is electrically connected to said control circuit, that projects from and is fixed to said controller shell, and that is to be inserted into a transmission terminal of the electronic device for communication with the electronic device; and
an installation frame that is to be detachably mounted to the electronic device;
wherein said direction adjusting mechanism is connected between said installation frame and said transducer shell.

6. The audio transducer of claim 5, wherein said direction adjusting mechanism includes:
a body that is fixed to said installation frame; and
an adaption component that is connected between said body and said transducer shell to allow said transducer shell to be rotatable relative to said body.

7. The audio transducer of claim 5, wherein said direction adjusting mechanism includes:
a body;
a first adaption component that is connected between said transducer shell and said body to allow said transducer shell to be rotatable relative to said body about a central axis of said first adaption component; and
a second adaption component that is connected between said installation frame and said body to allow said body to be rotatable relative to said installation frame about a central axis of said second adaption component;
wherein the central axis of said first adaption component is transvers to the central axis of said second adaption component.

8. The audio transducer of claim 1, wherein said controller includes:
an installation frame that is to be detachably mounted to the electronic device;
a controller shell that is mounted to said installation frame;
a control circuit that is disposed in said controller shell and that is configured to control said microphones to cooperatively perform directional sound reception; and
a signal terminal that is electrically connected to said control circuit, that projects from said controller shell, and that is to be inserted into a transmission terminal of the electronic device for communication with the electronic device;
wherein said direction adjusting mechanism is connected between said installation frame and said transducer shell.

9. The audio transducer of claim 1, wherein the desired angle formed by the normal direction of said sound receiving surface and the image capturing direction of the electronic device is in a range from 30 degrees to 90 degrees.

10. An audio transducer system, comprising:
an audio transducer device that is adapted for being mounted and communicatively connected to an electronic device, that has a sound receiving surface to be rotated to a position where a normal direction of said sound receiving surface and an image capturing direction of the electronic device form an angle as desired by a user therebetween, and that includes a microphone module, said sound receiving surface being formed with multiple sound collecting holes, said microphone module including multiple microphones that correspond in position to said sound collecting holes of said sound receiving surface for receiving sound, and being configured to be controlled by a beamforming technology to perform directional sound reception to pick up sound coming from a sound reception direction that corresponds to a direction data piece received by said audio transducer device; and
a sound pickup control module that is a software program to be installed in the electronic device, and that includes:
an image tracking unit configured to track a position of a target person in a captured image based on a target feature parameter set that corresponds to the target person to obtain the direction data piece, the captured image being an image captured by the electronic device; and
a sound pickup control unit configured to control the electronic device to transmit the direction data piece to said audio transducer device.

11. The audio transducer system of claim 10, wherein said sound pickup control module further includes a feature establishing unit that is configured to analyze features of persons in the captured image, so as to establish and store feature parameter sets that respectively correspond to the persons.

12. The audio transducer system of claim 11, the electronic device including a screen to display the captured image, wherein said feature establishing unit is configured to recognize human faces in the captured image that is currently being displayed on the screen, to mark each of the human faces thus recognized, and to establish, when a user selects one of the human faces thus marked, one of the feature parameter sets that corresponds to one of the persons who corresponds to the selected one of the human faces.

13. The audio transducer system of claim 12, wherein said feature establishing unit is further configured to control the screen to display a character icon for each of the persons in the captured image for whom the corresponding ones of the feature parameter sets have been established; and
wherein said image tracking unit is configured to, when one character icon among the character icons that respectively correspond to the persons in the captured image is selected by the user, make one of the persons that corresponds to said one character icon serve as the target person, and to analyze and track the target person in the captured image to obtain the direction data piece.

14. The audio transducer system of claim 10, wherein said sound pickup control module further includes a device control unit that is configured to, upon detecting that the electronic device has been communicatively connected to said audio transducer device, control the electronic device to turn off a microphone built in the electronic device.

15. The audio transducer system of claim 10, wherein said audio transducer device includes:
an audio transducer that includes a transducer shell having the sound receiving surface, and said microphone module;
a controller that is to be detachably mounted and communicatively connected to the electronic device and that is communicatively connected to said audio transducer, said controller being configured to control said microphones to cooperatively perform directional sound reception to obtain audio data that is to be transmitted to the electronic device; and a direction adjusting mechanism that interconnects said transducer shell and said controller in such a way that said transducer shell is rotatable relative to said controller for rotating said sound receiving surface.

16. The audio transducer system of claim 15, wherein said controller includes:

a controller shell;

a control circuit that is disposed in said controller shell and that is configured to control said microphones to cooperatively perform direction sound reception; and a signal terminal that is electrically connected to said control circuit, that projects from and is fixed to said controller shell, and that is to be inserted into a transmission terminal of the electronic device for communication with the electronic device;

wherein said direction adjusting mechanism is connected between said controller shell and said transducer shell.

17. The audio transducer system of claim 16, wherein said direction adjusting mechanism includes a body that is fixed to said controller shell, and an adaption component that is connected between said body and said transducer shell to allow said transducer shell to be rotatable relative to said body.

18. The audio transducer system of claim 16, wherein said direction adjusting mechanism includes:

a body;

a first adaption component that is connected between said transducer shell and said body to allow said transducer shell to be rotatable relative to said body about a central axis of said first adaption component; and a second adaption component that is connected between said controller shell and said body to allow said body to be rotatable relative to said controller shell about a central axis of said second adaption component;

wherein the central axis of said first adaption component is transvers to the central axis of said second adaption component.

19. The audio transducer system of claim 15, wherein said controller includes:

a controller shell;

a control circuit that is disposed in said controller shell and that is configured to control said microphones to cooperative perform direction sound reception;

a signal terminal that is electrically connected to said control circuit, that projects from and is fixed to said controller shell, and that is to be inserted into a transmission terminal of the electronic device for communication with the electronic device; and an installation frame that is to be detachably mounted to the electronic device;

wherein said direction adjusting mechanism is connected between said installation frame and said transducer shell.

20. The audio transducer system of claim 19, wherein said direction adjusting mechanism includes:

a body that is fixed to said installation frame; and an adaption component that is connected between said body and said transducer shell to allow said transducer shell to be rotatable relative to said body.

21. The audio transducer system of claim 19, wherein said direction adjusting mechanism includes:

a body;

a first adaption component that is connected between said transducer shell and said body to allow said transducer shell to be rotatable relative to said body about a central axis of said first adaption component; and a second adaption component that is connected between said installation frame and said body to allow said body to be rotatable relative to said installation frame about a central axis of said second adaption component;

wherein the central axis of said first adaption component is transvers to the central axis of said second adaption component.

22. The audio transducer system of claim 19, wherein the desired angle formed by the normal direction of said sound receiving surface and the image capturing direction of the electronic device is in a range from 30 degrees to 90 degrees.

23. The audio transducer system of claim 15, wherein said controller includes:

an installation frame that is to be detachably mounted to the electronic device;

a controller shell that is mounted to said installation frame;

a control circuit that is disposed in said controller shell and that is configured to control said microphones to cooperatively perform directional sound reception; and a signal terminal that is electrically connected to said control circuit, that projects from said controller shell, and that is to be inserted into a transmission terminal of the electronic device for communication with the electronic device;

wherein said direction adjusting mechanism is connected between said installation frame and said transducer shell.

* * * * *